Sept. 19, 1967 R. Z. BUNTIC 3,341,903
PLASTIC FASTENER
Filed May 28, 1965
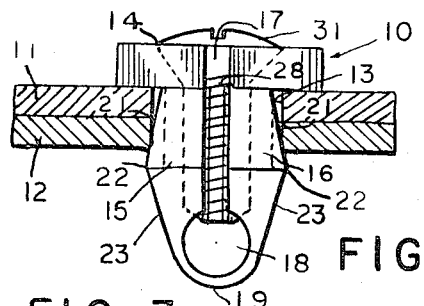
FIG. 1.
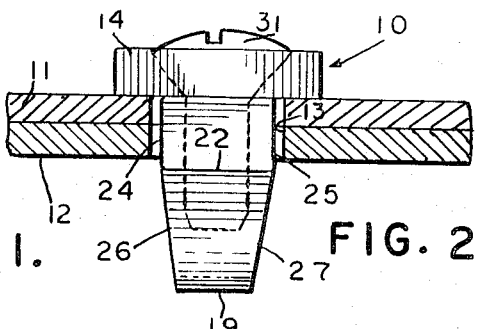
FIG. 2.
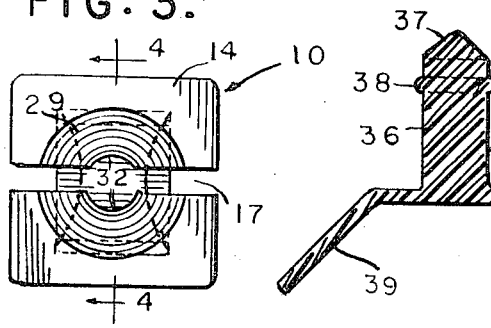
FIG. 3. FIG. 4.
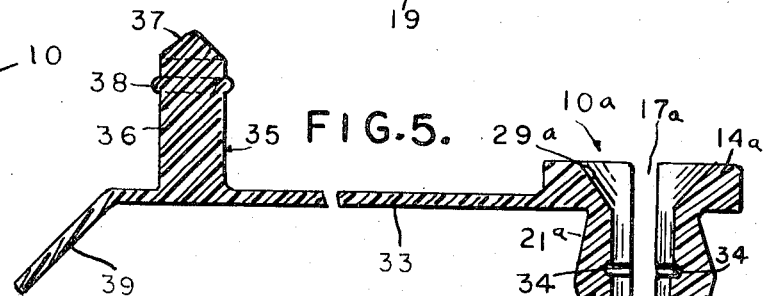
FIG. 5. FIG. 6.
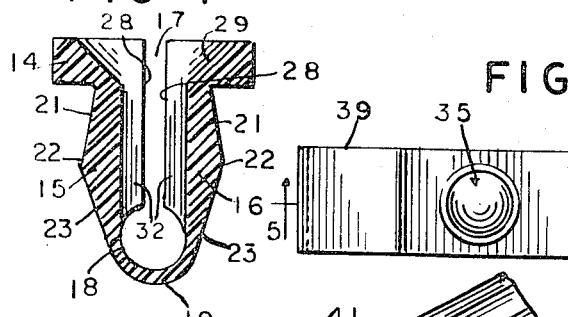
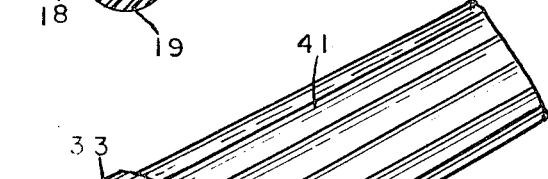
FIG. 7.
INVENTOR:
ROBERT Z. BUNTIC
BY Wilson & Geppert
ATTORNEYS

United States Patent Office 3,341,903
Patented Sept. 19, 1967

3,341,903
PLASTIC FASTENER
Robert Z. Buntic, Elmhurst, Ill., assignor to National Lock Co., Rockford, Ill., a corporation of Delaware
Filed May 28, 1965, Ser. No. 459,741
6 Claims. (Cl. 24—16)

The present invention relates to a novel fastener and more particularly to a blind hole fastener formed of a suitable resilient or deformable material.

Many instances occur where access to an opening for a suitable fastener means is limited or one side of the part is inaccessible. Various types of fastening means have been developed for insertion into these blind openings for joining two parts together where the fastener can be inserted into the opening and then expanded to engage the edges of the opening and to form an enlarged end beyond the parts to be joined in the inaccessible area. The present invention provides a simplified new and improved fastener for blind openings formed out of a suitable plastic material.

Among the objects of the present invention is the provision of a plastic fastener whose insertion into the opening is accomplished with very little force, but will provide full holding power after a stud or screw is inserted into the fastener. The fastener is provided with a slot across its center and a loop connecting the entering ends of the prongs formed by the slot. When the fastener is inserted, the loop collapses allowing the prongs to be pressed together and, after the high point on the prongs passes through the opening, the fastener will expand or return to its original shape to yieldably retain itself in the opening ready for insertion of the stud or screw.

Another object of the present invention is the provision of a plastic fastener that can be manufactured in a more economical way than previous fasteners since the part requires no movable side coring operations. The part is suitable for automatic high speed molding accomplished in a single step or stage, thereby reducing the cost of tooling and production.

A further object of the present invention is the provision of a plastic fastener, which may be utilized as an insulating grommet or strain-relief bushing. Most grommets or bushings hold and direct a wire or wires in a direction perpendicular to the panel in which it is mounted. Frequently, it is desirable to redirect the wires after entering a compartment in a direction parallel to the panel to avoid becoming entangled in mechanisms or electronic devices immediately within the panel; and the present fastener may do so at the user's option.

Another object of the present invention is the provision of a plastic fastener which may be utilized with a variety of head configurations to accomplish varying functional requirements such as a shelf support stud, a molding clip, an insulating electrical stand-off, a drawer slide, etc.

The present invention also comprehends the provision of the plastic fastener utilized with a retaining strap and a complementary stud as an easily detachable cable or wire clamp. The stud includes an annular bead around its diameter which nests into a mating recess in the fastener body to provide a positive holding action. The stud and fastener are integrally formed on opposite sides and opposite ends of the strap utilized to hold the wires or cable. A tab on the strap adjacent the stud provides for easy removal of the stud from the fastener.

The present invention further comprehends the provision of a fastener having a generally cylindrical passage longitudinally extending through the fastener body for a stud or screw, but terminating short of the solid loop. Also a transverse passage at the entering end of the fastener defines the configuration of and aids in the flexibility of the loop joining the two spaced prongs.

Further objects are to provide a construction of maximum simplicity, efficiency, economy and ease of assembly and operation, and such further objects, advantages and capabilities as will later more fully appear and are inherently possessed thereby.

In the drawing:
FIGURE 1 is a front elevational view of the plastic fastener of the present invention showing its insertion into a pair of members or plates and a screw inserted into the fastener to develop maximum holding power.

FIG. 2 is a side elevational view of the fastener inserted in a pair of members as shown in FIG. 1.

FIG. 3 is a top plan view of the fastener of FIG. 1.

FIG. 4 is a vertical cross sectional view taken on the line 4—4 of FIG. 3.

FIG. 5 is a vertical cross sectional view of a modified form of fastener and stud mounted integrally on a strap, the view being taken on the line 5—5 of FIG. 6.

FIG. 6 is a top plan view of the fastener, stud and strap of FIG. 5.

FIG. 7 is a perspective view of the fastener shown in FIGS. 5 and 6 in assembled relation with a plurality of wires or cable encompassed and retained by the strap and the stud operatively connected to the fastener.

Referring more particularly to the drawing wherein are shown illustrative embodiments of the present invention, FIGS. 1 to 4 disclose a plastic fastener 10 which is utilized to join two members such as plates 11 and 12 together as shown in FIG. 2. The fastener is utilized in areas of limited access to one side of the plates such as for blind openings 13, and the fastener is formed of a suitable plastic material, such as nylon, which may be readily deformed but will expand or resume its normal shape once the deformation pressure ceases.

The fastener 10 includes an enlarged generally square head 14 and a depending body divided into a pair of prongs 15, 16 by a centrally positioned longitudinal slot 17 which extends through the head and body portion to a generally cylindrical transverse passageway 18 defining a connecting loop 19 integral with and joining the lower ends of the two prongs 15, 16. Each prong includes a side wall 21 with the side walls of the two prongs opposing and diverging to a high point or ridge 22 on each prong and then converging as at 23 and merging into the loop 19. The other opposed pair of side walls 24 and 25 (FIG. 2) are parallel from the base or head 14 to the ridges 22 and then converge or taper inwardly at 26 and 27 to the loop 19 at the lower or depending closing end of the fastener. The walls 28 formed by the slot 17 are normally parallel.

The head 14 includes a centrally positioned countersunk portion or depression 29 for the reception of the head of a screw or stud 31 (FIG. 2) and the interior walls 28 have opposed longitudinal arcuate channels 32 forming a generally cylindrical longitudinally extending passage to receive the threaded shank of the screw or stud 31; the passage having a normal diameter as seen in FIG. 3 approximately equal to the diameter of the transverse passage 18. To receive a screw or stud 31, such as shown in FIG. 2, the diameter of the passage formed by channels 32 is slightly less than the crest diameter of the screw 31 so that the screw threads will engage and deform the surfaces of channels 32 to provide a threaded engagement between the screw 31 and the fastener 10. Also, the screw 31 is of a length such that the point extends into the passage 18 but stops short of penetrating the loop 19.

In utilizing this fastener for a blind opening, the members or plates 11 and 12 are located in operative position or assembled relation with the openings 13 therein aligned and the fastener 10 is inserted in and pressed into the openings 13 to the position shown in FIG. 2. As the distance between the ridges 22 is greater than the distance across the side of the opening 13, when the fastener 10 is inserted, the loop 19 will collapse bringing the prongs 15 and 16 closer together as the ridges 22 pass through the openings 13. As seen in FIG. 2, in assembled relation the ridges 22 extend or locate slightly below the lower surface of the plate 12 to allow the loop 19 and prongs 15 and 16 to expand and return to their substantially normal positions. With the ridges 22 extended slightly beyond the lower member or plate 12, the enlarged head 14 abuts and contacts the top surface of the member or plate 11 to retain the members together in abutting relation. To provide full holding power, the screw 31 is inserted into threading engagement in the fastener 10 to aid in expansion of the prongs 15 and 16 so that the sides 21 of the prongs engage the edges of the openings 13 with full holding power for preventing removal.

This fastener 10 can be used as a grommet or strain-relief bushing for the introduction of wires through a side panel with the wires entering through the passage formed by the channels 32 and then being bent to pass through the transverse passage 18. Obviously, the screw 31 would not be used to retain the fastener where it is used as a grommet or bushing.

A modification of the novel fastener 10 is shown in FIGS. 5 to 7, inclusive, with the fastener 10ª being substantially identical with the fastener 10 shown in FIGS. 1 to 4, but integral with and mounted on one end of a strap 33. The only difference in the fastener 10ª is the provision of arcuate transverse-recesses or grooves 34 in the channels 32ª forming a generally annular groove in the passage formed by the channels 32ª to receive a conforming stud 35 also integral with but formed or mounted on the strap 33 adjacent to but spaced from its opposite end. The fastener 10ª includes the parallel sides 24ª and 25ª, the diverging sides 21ª terminating in the ridges 22ª and then converging at 23ª and merging into the connecting loop 19ª, and the enlarged head 14ª with a countersunk opening 29ª, the head and body portion being slotted at 17ª to provide a pair of prongs or sides 15ª, 16ª.

The stud 35 includes a body 36 which is cylindrical or of a form conformably received in the opening of the fastener and having a tapered or conical end 37 and an annular bead 38 adjacent to the conical end 37 and this bead 38 conformably received in the recesses or grooves 34 in the fastener 10ª. The strap 33 has the fastener 10ª at one end and an offset or tab portion 39 at the opposite end; the stud 35 being spaced inwardly from the tab portion 39. As shown in FIG. 7, the strap 33 is of a length to encompass a bundle of wires or cable 41 and act as an easily detachable clamp. FIG. 7 discloses the fastener 10ª and stud 35 operatively engaged with the strap 33 retaining the wires 41. The tab portion 39 at the end of the strap provides for easy withdrawal and removal of the stud from the fastener.

Both the fastener 10 and the modification of the fastener 10ª with the strap 33 and stud 35 are molded from a suitable flexible or resilient plastic material in a one-step operation without the additional movable side coring operations needed in the formation of previous fasteners. Costs of tooling and production are thereby reduced and the part is suitable for automatic high speed molding equipment. In each form of the present invention, the screw or stud 31 (FIG. 2) and the stud 35 (FIGS. 5 and 7) when inserted into the opening of the fastener retains the sides or prongs against collapse and thereby assure full holding power in the member or members in which the fastener is mounted.

Having thus disclosed the invention, I claim:

1. A wire holding and retaining member comprising a strap having a recessed fastener at one end thereof and a stud affixed at one end to the strap and projecting from adjacent the other end for insertion in the recess of said fastener, said stud having an annular bead formed thereon adjacent the other end, and said fastener including an enlarged head and a depending body portion divided by a longitudinally extending transverse slot open at one end to form a pair of prongs, and a loop joining the lower ends of the prongs, said transverse slot terminating adjacent the loop in an enlarged generally cylindrical transverse passage defining the loop, said head and body portion having a central longitudinally extending passage, adapted to receive said stud, intersecting and terminating at said transverse passage and provided with an annular recess formed in the walls of the passage and spaced from the transverse passage.

2. A wire holding and retaining member as set forth in claim 1, including a lift tab on the end of the strap adjacent the stud formed at an obtuse angle to the strap providing for easy withdrawal of the stud from the fastener.

3. A wire holding and retaining member as set forth in claim 1, in which said body portion of the fastener includes a pair of opposite sides which diverge from the head to enlarged ridges and then converge and merge into the loop, and a second pair of opposite sides which are parallel from the head to the ridges and then converge toward the loop.

4. A wire holding and retaining member as set forth in claim 1, in which said stud and said fastener depend in claim 1 from opposite sides of the strap and the stud is conformably received within the central passage in the fastener and terminates short of the transverse passage.

5. A fastener formed of a resilient material comprising an enlarged head and a depending body portion both divided by a transverse and longitudinally extending slot forming a pair of prongs, a loop integral with and joining the prongs, said slot terminating adjacent the loop in an enlarged transverse passage extending through said body portion, said head and body portion having a central longitudinally extending passage therethrough intersecting and terminating at the enlarged transverse passage, and an elongated screw received in and threadingly engaging said central longitudinally extending passage in the head and body portion, with the inner end of the screw initially terminating adjacent the transverse enlarged passage, to retain the fastener in anchored position and thereafter extending into said transverse enlarged passage to abuttingly engage and frictionally retain an article positioned in the said transverse enlarged passage.

6. A fastener formed of a resilient material comprising an enlarged head and a depending body portion having a transverse and longitudinally extending slot open at one end for dividing the head and body portion into a pair of prongs, an imperforate loop integral with and joining the lower ends of the prongs, said slot terminating adjacent the loop in an enlarged generally cylindrical transverse passage defining the loop, said depending body portion having a pair of opposed sides diverging from said head to enlarged ridges and then converging to and merging with said loop and a second pair of opposed sides being parallel from said head to said ridges and then converging to said loop, said transverse slot and enlarged passage extending between said second pair of opposed sides, said head and body portion having a central longitudinally extending passage intersecting and terminating at said transverse passage, and a screw threadingly engaging the central longitudinally extending passage to secure the fastener in place and initially terminating short of said transverse passage to leave the transverse passage unencumbered to receive an article therein and thereafter extending into said cylindrical transverse passage to frictionally engage the said article.

(References on following page)

References Cited

UNITED STATES PATENTS

| | | | |
|---|---|---|---|
| 3,031,049 | 4/1962 | Somville | 24—73 X |
| 3,118,644 | 1/1964 | Werning | 248—74 X |
| 3,144,695 | 8/1964 | Budwig | 248—74 X |
| 3,203,304 | 8/1965 | Rapata | 24—73 X |

FOREIGN PATENTS

| | | |
|---|---|---|
| 1,222,697 | 1/1960 | France. |
| 511,488 | 8/1939 | Great Britain. |
| 745,788 | 2/1956 | Great Britain. |
| 888,567 | 1/1962 | Great Britain. |

WILLIAM FELDMAN, *Primary Examiner.*

DONALD A. GRIFFIN, *Assistant Examiner.*